(12) United States Patent
Ligon (10) Patent No.: US 7,484,960 B2
(45) Date of Patent: Feb. 3, 2009

(54) PRINTED MATTER FOR JOINT READING BY A VISUALLY IMPAIRED AND A SIGHTED PERSON

(75) Inventor: John Eric Ligon, Denton, TX (US)

(73) Assignee: BrailleInk, Denton, TX (US)

( * ) Notice: Subject to any disclaimer, the term of this patent is extended or adjusted under 35 U.S.C. 154(b) by 227 days.

(21) Appl. No.: 11/094,059

(22) Filed: Mar. 30, 2005

(65) Prior Publication Data
US 2005/0250077 A1 Nov. 10, 2005

Related U.S. Application Data (60) Provisional application No. 60/569,589, filed on May 10, 2004.

(51) Int. Cl.
*G09B 21/00* (2006.01)
(52) U.S. Cl. ...................................... 434/113; 434/178
(58) Field of Classification Search ................. 434/112, 434/113, 114, 115, 156, 178; 281/15.1; 283/46, 283/63.1
See application file for complete search history.

(56) References Cited

U.S. PATENT DOCUMENTS

| | | | | |
|---|---|---|---|---|
| 3,903,617 | A * | 9/1975 | Evans | 434/171 |
| 4,404,764 | A * | 9/1983 | Wills et al. | 40/124.11 |
| 4,600,320 | A | 7/1986 | Hoovier et al. | |
| 5,033,964 | A * | 7/1991 | Phelps | 434/113 |
| 5,275,567 | A * | 1/1994 | Whitfield | 434/113 |
| 5,608,979 | A * | 3/1997 | Johnson | 40/491 |
| 5,626,365 | A * | 5/1997 | Petteway | 281/15.1 |
| 5,779,482 | A * | 7/1998 | Fukumoto | 434/113 |
| 5,957,693 | A * | 9/1999 | Panec | 434/178 |
| 6,561,091 | B1 | 5/2003 | Steve | |
| 6,859,206 | B2 * | 2/2005 | Cleveland | 345/471 |

OTHER PUBLICATIONS

"Copies of pages from Telesoft website announcing Gemini Printer"; Jan. 2004.*
BlindNews:The CNIB Invites Visitors to Meet Jeff Healey and Learn How 'Braille Gets Digital!' at Upcoming Word on the Street Festival, Sep. 26, 2002 [retrieved online Mar. 13, 2007].*
"Seedlings Braille Books for Children", Apr. 9, 2001 [retrieved online Mar. 13, 2007].*
"Who's Hot," p. 22, Michigan: The Magazine of The Detroit News, May 24, 1987.

(Continued)

*Primary Examiner*—Kurt Fernstrom
(74) *Attorney, Agent, or Firm*—Reza Mollaaghababa; Thomas J. Engellenner; Nutter McClennen & Fish LLP (57) ABSTRACT

The present invention provides a print lay-out of conventional textual characters and corresponding Braille characters that facilitates concurrent reading of the textual and the Braille characters, respectively, by a sighted person and a visually impaired, or blind, individual. More particularly, the textual and Braille characters can be presented in a pattern such that each textual character is associated with its corresponding Braille character in a one-to-one relationship. In some embodiment, the print lay-out is applied to one or more concordant pages of a book suitable for simultaneous use by a sighted person and a visually impaired individual.

14 Claims, 6 Drawing Sheets

OTHER PUBLICATIONS

National Braille Press catalog citing article, "You are Special," 2002, p. 10.
"I Love You Through and Through," Rossetti-Shustak (2005).
Reading Comes Naturally: A Mother and Her Blind Child's Experiences, Journal Of Visual Impairment & Blindness, col. 2, Jan. 1985.
Encouraging an Adolsecent Daughter Who Is Blind and Learning Disabled to Read and Write, p. 216, Journal of Visual Impairment & Blindness, dated May-Jun. 1997.
"God, I've Gotta Talk to You", Ann Jennings (2002).
"You are Special," Max Lucado (1997).
*Braille into the Next Millennium*, National Library Service for the Blind and Physically Handicapped, p. 48 (2000).
C.F. Gordon-Cumming, The Inventor of the Numeral Type for China by the Use of Which Illiterate Chinese both Blind and Sighted Can Very Quickly be Taught to Read and Write Fluently, Downey & Co., Ltd., pp. 90, 91, 136, 137 (1898).
Brochure distributed by the American Foundation for the Blind, Inc. (Sep. 21, 1965).
Article describing AFB system, Special Libraries Association, vol. 55, No. 9 (Nov. 1964).
A manufacturer's sample distributed by Addressograph-Multigraph Corporation (1970).
IRS Ruling showing that "braille multigraph machine" has been manufactured before 1964.
A web page on the history of Address-graph-Multigraph (1978).
A page from the New York Times, (Nov. 4, 1981).
2006 Catalog from Seedlings.
A public advisement and related webpage (Jan. 2002).
Standards published by the Braille Authority of North America (1997).
Pages from Telesoft Website announcing Gemini printer (Jan. 2004).
Page from Viewplus Website regarding Braille/ink printer.

* cited by examiner

Figure 1A

Little Bo Peep

Has lost her sheep

And can't tell where

# PRINTED MATTER FOR JOINT READING BY A VISUALLY IMPAIRED AND A SIGHTED PERSON

RELATED APPLICATION

The present invention claims priority to a provisional application entitled "Format For Shared Reading by Sighted and Visually Impaired or Blind Individual," filed on May 10, 2004, and having a Ser. No. 60/569,589.

BACKGROUND OF THE INVENTION

The present invention relates generally to a print layout of Braille and conventional characters that allow a visually impaired person and a sighted person concurrently read a text.

Braille is a well-established code that allows a visually impaired or a blind person to read. The Braille code utilizes a matrix of 6 dots (2 columns of 3 dots each) to represent letters, numerals and punctuation marks. Although a variety of print media, e.g., books, magazines, incorporating the Braille code are available for use by the visually impaired, it is currently difficult for a sighted person and a visually impaired individual to concurrently read a print medium, e.g., a book. Such difficulties can give rise to variety of educational obstacles, for example, in educating children having blindness or visual impairments. Further, the inability of a sighted educator or parent to share a book with a child having visual impairments can deprive the child of social and familial bonding that such an interaction can foster.

Hence, there is a need for improved print-layouts and books that allow simultaneous use by a sighted person and a visually impaired individual.

SUMMARY OF THE INVENTION

In one aspect, the present invention provides a book suitable for concurrent use by a sighted person and a visually impaired person that includes at least one concordant page containing one or more conventional textual characters suitable for reading by a sighted person and one or more Braille characters corresponding to the textual characters. The textual and Braille characters are presented on the concordant page in a pattern that presents each textual character in association with its corresponding Braille character in a one-to-one relationship.

In a related aspect, each conventional textual character can be printed substantially above a corresponding Braille character so as to generate a one-to-one relationship between the conventional and the Braille characters. Alternatively, a Braille character can be presented above its corresponding conventional textual character.

The Braille characters can be presented on the page in a variety of different ways. For example, a Braille character can be embossed on the page in the form of a raised character generated from the same material as, or different material than, that of the surrounding area of the page. Alternatively, the Braille characters can be formed as visual dots printed on the page, for example, for teaching a sighted person to read Braille. The Braille characters can be in uncontracted ("Grade 1") or contracted ("Grade 2") form, and can be selected to have a desired size, e.g., standard or jumbo.

In another aspect, the Braille characters and their associated conventional characters, arranged in a one-to-one relationship relative to the Braille characters, are presented in one portion of the page, and another copy of the conventional textual characters, sized and spaced for normal reading, are presented on a different portion of the page. For example, the Braille characters and associated conventional characters can be provided in a lower portion of the page and the conventional characters in an upper portion. The conventional textual characters can be preferably sufficiently removed from the Braille characters so that a sighted person can read the text in the upper portion while a visually impaired person reads the Braille characters in the lower portion.

The book can also include a page opposite the concordant page containing a copy of the textual characters sized and shaped for normal reading by a sighted person.

In yet another aspect, the invention provides a book suitable for simultaneous use by a sighted person and a visually impaired person that includes at least one page upon which one or more conventional textual characters suitable for reading by a sighted person are presented. A translucent, or transparent sheet, is also provided on which one or more Braille characters corresponding to the conventional textual characters are embossed such that the sheet can be laid over the page so as to bring each Braille character into a one-to-one concordant relationship with respect to a corresponding textual character.

In other aspects, a print medium is provided on which a plurality of characters are presented. The print medium can present one or more conventional textual characters suitable for reading by a sighted person, and one or more Braille characters. The Braille characters can be presented, e.g., embossed, on the medium so as to provide a one-to-one correspondence between each of the textual characters and its associated Braille character. The one-to-one correspondence can be achieved, for example, by presenting, for each Braille character, a corresponding conventional textual character directly above the Braille character. Further, another copy of the conventional textual characters, sized and shaped for normal reading by a sighted person, can be presented in another portion of the medium sufficiently removed from the Braille characters such that the hand of a visually impaired or blind person reading the Braille characters would not inhibit the ability of a sighted person to read the conventional text. Moreover, one or more illustrations can be printed in another portion of the medium so that it can be viewed by a sighted person while the visually impaired or blind individual is reading the Braille text.

In yet another aspect, the present invention provides a print medium on which one or more contracted Braille characters are presented. Further, one or more conventional textual characters are printed on the medium such that each of the contracted Braille characters is positioned in a one-to-one correspondence relative to one or more of the conventional characters corresponding thereto.

The print medium can be formed of any suitable material, such as paper, plastic, or any other medium on which conventional and Braille characters can be presented.

Further understanding of the invention can be obtained by reference to the following detailed description in conjunction with the associated drawings, described briefly below.

DETAILED DESCRIPTION

Figure 1A:
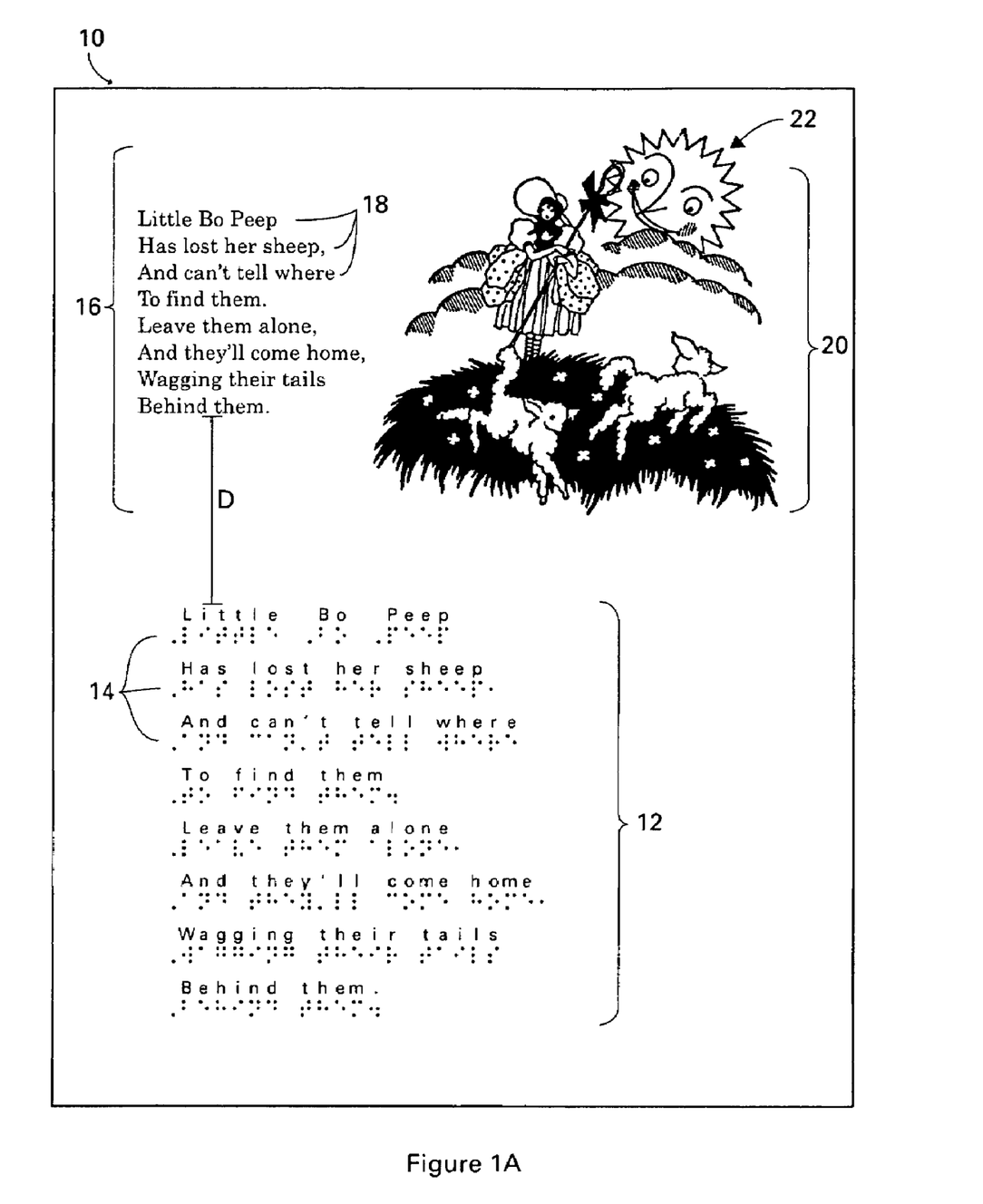
FIG. 1A schematically depicts a print medium on which conventional and Braille characters are printed based on a print lay-out in accordance with one embodiment of the invention.

FIG. 1A schematically illustrates a print medium 10 according to one embodiment of the invention in a lower portion 12 of which one or more Braille characters 14 are presented. An upper portion 16 of the exemplary print medium includes one or more conventional textual characters 18, suitable for reading by a sighted person, that provide content corresponding to the information conveyed by the Braille characters. The conventional characters disposed in the upper portion 16 are generally sized and spaced for normal reading by a sighted person. In this exemplary embodiment, in a section 20 of the upper portion of the medium, an illustration 22 can be optionally presented.

The print medium can be, for example, formed of paper, plastic, or any other suitable material on which the Braille and the conventional textual characters can be provided. In some embodiments, the Braille characters can be embossed on the print medium 10 (e.g., as characters formed of the same material as the print medium but raised relative to the surrounding surface) while in other embodiments the Braille characters can be formed of a different material than that of the print medium and raised relative to their surrounding surface. Yet in other embodiments, the Braille characters can be formed as visual dots printed on the medium without being raised relative to the surrounding surface. Such visual dots can be employed, for example, to teach a sighted person to read Braille. The Braille characters can have a standard size, or alternatively a "jumbo" size—a larger size that can be easier for some visually impaired persons to read.

In this exemplary embodiment, in addition to the conventional text presented in the upper portion, conventional characters are repeated in the lower portion such that each Braille character is associated with its corresponding conventional textual character in a one-to-one relationship. More particularly, for each Braille character in the lower portion, a corresponding conventional character is printed substantially above the Braille character in a manner that indicates one-to-one association. For example, in this exemplary embodiment, the conventional character "L" in the word "Little" at the beginning of the text is printed directly above the Braille character signifying "L." Similarly, each of the other conventional characters in this word and the subsequent words is printed directly above its respective Braille character. In this manner, a sighted person can readily identify, for each Braille character, the textual character to which it corresponds. The spacing between this set of conventional characters is selected so as to clearly indicate a one-to-one association between a conventional character and its translation in Braille. Hence, in this exemplary embodiment, the spacing between the conventional characters in the lower portion is somewhat larger that the respective spacing shown for the conventional characters presented in the upper portion, which are intended for normal reading by a sighted person.

Figure 1B:
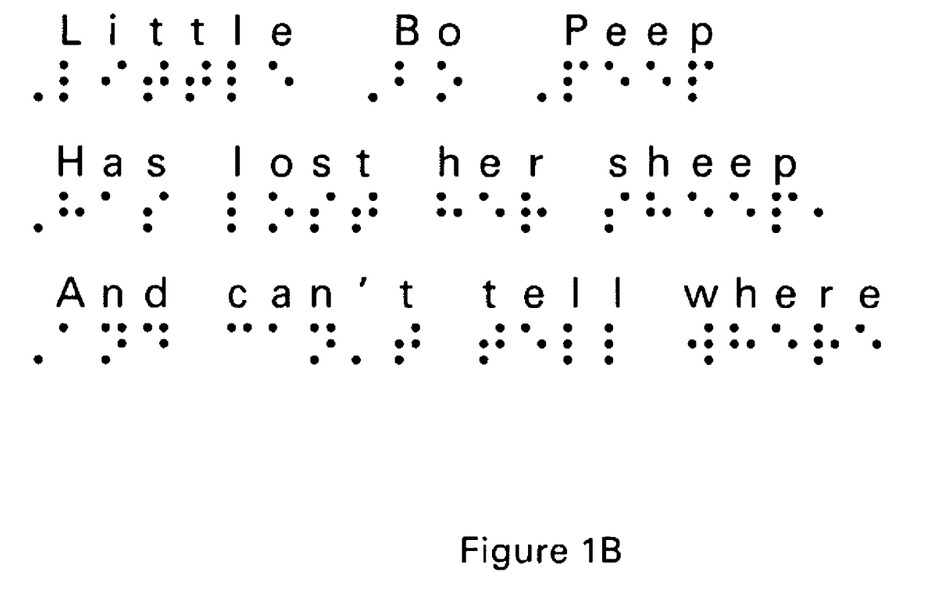
FIG. 1B depicts a portion of the conventional and Braille characters presented in a lower portion of the print medium depicted in FIG. 1A, further illustrating a one-to-one relationship between each Braille character and its corresponding conventional character, FIG. 2 schematically illustrates a book having at least one concordant page on which conventional and Braille characters are printed in accordance with one embodiment of the invention, FIG. 3 schematically depicts a book in accordance with another embodiment of the invention having a concordant page on which a pattern of conventional textual characters and their corresponding Braille characters are presented such that each textual character is in a one-to-one relationship with its associated Braille character, FIG. 4 schematically depicts a book having a page on which one or more conventional textual characters are printed and a translucent sheet on which one or more Braille characters corresponding to the conventional characters are embossed such that the sheet can be placed on the page so as to provide a one-to-one relationship between each conventional character and its associated Braille character, FIG. 5 schematically depicts an embodiment of the book of FIG. 4 having a pocket formed in a cover thereof in which the translucent sheet can be stored.

FIG. 1B presents a portion of the Braille and conventional characters presented in the lower portion of the print medium depicted in FIG. 1A to further illustrate the one-to-one relationship between each Braille character and its corresponding conventional character. In particular, for each Braille character, its corresponding conventional character (i.e., its translation) is presented directly above the Braille character and sufficiently removed from the other characters to allow a sighted person to readily identify each Braille character with its translated conventional character.

With continued reference to FIG. 1A, the distance between the upper portion 16 of the print medium in which only the conventional textual characters are presented and the lower portion 12 in which both the Braille characters and their associated conventional characters are presented is selected such that a sighted person can read the conventional text in the upper portion while a visually impaired person is concurrently reading the Braille characters in the lower portion. In other words, a minimum distance D between the upper Braille characters in the lower portion and the lower conventional characters in the upper portion is sufficiently large to allow reading of the textual characters by a sighted person without interference from the hand of a visually impaired person concurrently reading the Braille characters. Similarly, the portion 20 in which the illustration 22 is presented in also sufficiently removed from the Braille characters so that it can be viewed by a sighted person while a visually impaired person in simultaneously reading the Braille characters.

Figure 2:
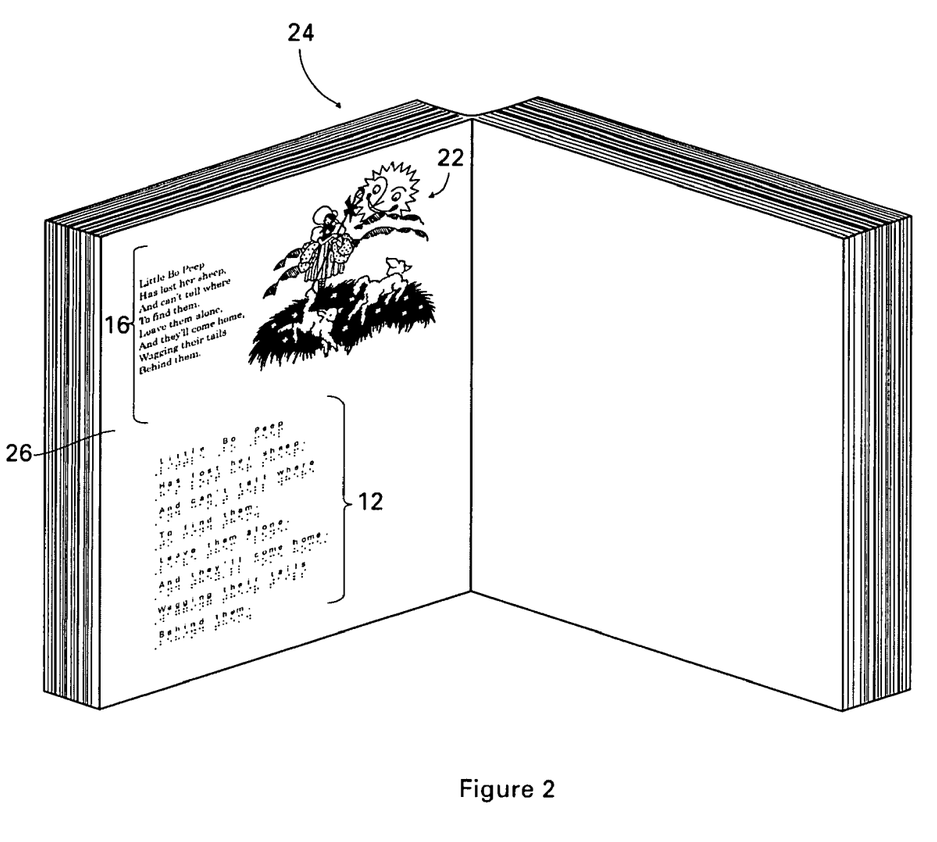

The lay-out of the conventional and Braille characters described above can also be utilized in a book whose pages can be formed of the print medium 10, e.g., paper. By way of example, FIG. 2 schematically illustrates a book 24 according to one embodiment of the invention that is suitable for concurrent use by a sighted person and a visually impaired or blind person. The book 24 includes at least one concordant page 26 containing textual characters disposed in upper portion 16 of the page, which are sized and spaced for normal reading by a sighted person. In a lower portion 12 of the concordant page, a duplicate of the textual characters provided in the upper portion as well as their corresponding Braille characters are presented in a pattern such that each Braille character is associated with a corresponding textual character in a one-to-one relationship, for example, in a manner described above. In a preferred embodiment, the Braille characters in the lower portion and the textual characters in the upper portion provide concordant content. Although the textual characters in the lower portion that are disposed in a one-to-one relationship relative to their corresponding Braille characters are typically spaced so as to retain their correspondence with the respective Braille characters, the textual characters in the upper portion are generally sized and spaced for normal reading by a sighted person. In addition, the page can include one or more illustrations, such as the illustration 22, in another portion thereof.

The upper portion 16 and the lower portion 12 are sufficiently spaced apart such that a sighted person can read the text in the upper portion as a visually impaired or blind person reads the Braille characters in the lower portion. Similarly, the portion containing the illustration(s) is sufficiently spaced from the Braille characters such that the illustration(s) can be viewed without interference from the hand of a visually impaired or blind person reading the Braille characters. While in many embodiments the Braille characters can comprise uncontracted (Grade 1) characters, in other embodiments, contracted (Grade 2) Braille characters can be utilized.

In some embodiments in which contracted Braille characters are employed, a Braille cell associated with a contracted Braille character can correspond to more than one conventional textual character, or possibly an entire word or words. In such cases, a print lay-out according to one aspect of the invention can provide a one-to-one correspondence between the Braille cell associated with the contracted character and one or more conventional characters that correspond to that contracted character. For example, the one-to-one correspondence can be between letters "gg" and a contracted Braille character corresponding to these letters.

Figure 3:
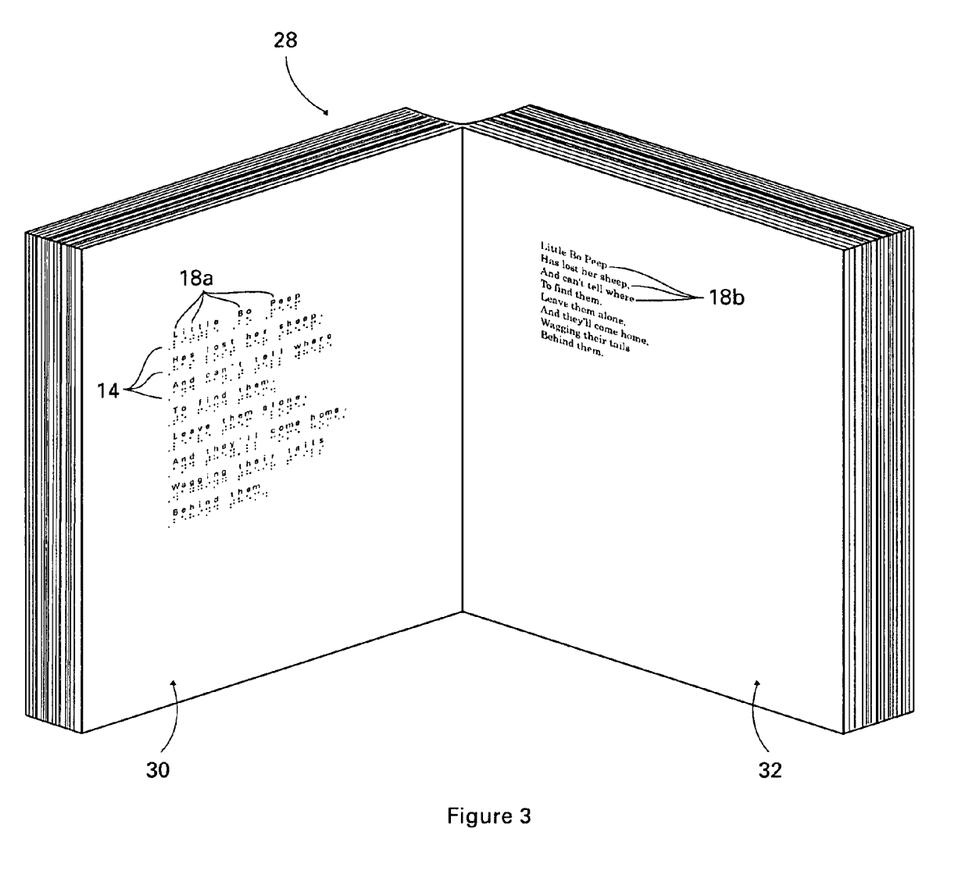

With reference to FIG. 3, in a book 28 in accordance with another embodiment of the invention, the one or more Braille characters 14 and the one or more conventional textual characters 18a corresponding thereto can be presented on a concordant page 30 such that there is a one-to-one correspondence between each Braille character and its associated textual conventional character. In this exemplary embodiment, on an opposed page 32, textual characters 18b sized and spaced for normal reading by a sighted person are printed. The content provided by the text 18b preferably corresponds to that provided by the Braille characters. In this manner, with the book open, a visually impaired or a blind person can read the Braille characters on one page while a sighted person simultaneously reads the conventional text on the opposed page. In addition, one or more illustrations (not shown) can be printed on the page 30 or the opposed page 32.

Figure 4:
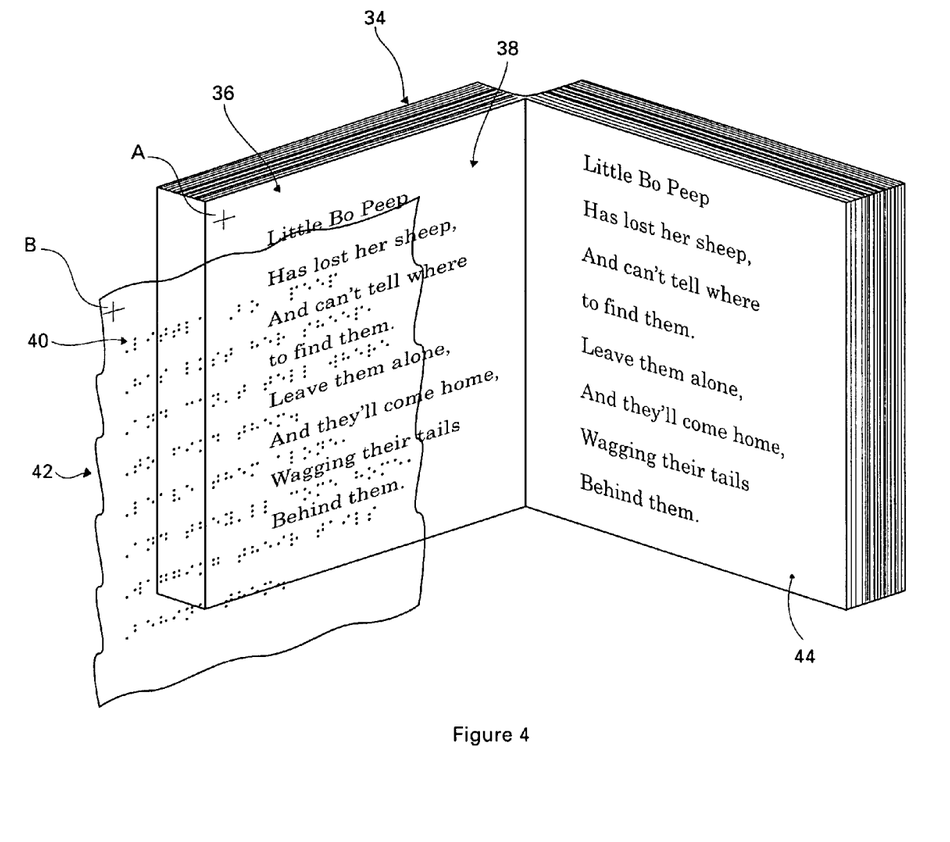

In another embodiment, with reference to FIG. 4, a book 34 according to another embodiment of the invention can include a page 36 on which a text 38 in the form of one or more conventional textual characters is printed. One or more Braille characters 40 are provided on a translucent or transparent sheet 42 such that when the sheet is laid over the page 36, each Braille character is positioned in a one-to-one concordant relationship relative to one of the textual characters corresponding thereto. In addition, a copy of the conventional textual characters 38, spaced and sized for normal reading by a sighted person, can be optionally printed on an opposed page 44 for normal reading by a sighted person.

Upon placing of the translucent sheet 42 upon page 36, and its proper alignment relative to the textual characters, both the conventional characters and the Braille characters can be concurrently read, and the sighted person can readily identify a Braille character corresponding to each conventional textual character. In some embodiments, visual indicators, such as cross bars A and B, can be provided on the translucent sheet 42 and the page 36 to facilitate placement of the sheet on the page and its alignment relative to the characters provided on the sheet. In another embodiment, the Braille characters can be presented on the page 36 and their corresponding conventional textual characters on the sheet 42 such that upon placement of the sheet on the page, a one-to-one relationship between each conventional textual character and its associated Braille character can be established.

Figure 5:
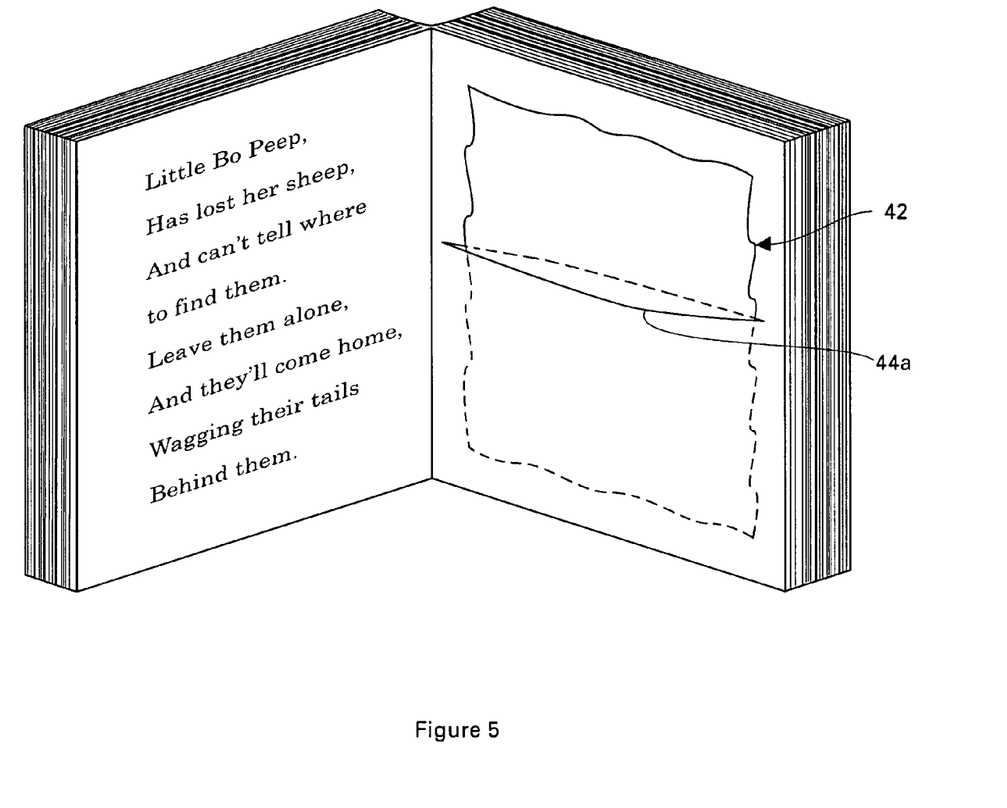

With reference to FIG. 5, in some embodiments, the transparent or translucent sheet 42, and possibly others corresponding to other pages of the book, can be stored in a pocket 44a provided, for example, in a cover page of the book.

A print medium on which a pattern of Braille and conventional textual characters in accordance with the teachings of the invention are presented can find applications not only as pages of a book suitable for concurrent reading by a sighted person and a visually impaired individual, but also in other applications that require reading. For example, in some embodiments, a print layout according to the teachings of the invention can be presented on a plurality of cards as instructions for a game. Each card can present both Braille and conventional characters, in a manner described in the above embodiments, to allow one or more sighted and visually impaired individuals to participate in playing a game by concurrently reading the cards.

Those having ordinary skill in the art will appreciate that various modifications can be made to the above exemplary embodiments without departing from the scope of the invention.

What is claimed is:

1. A book suitable for concurrent use by a sighted person and a visually impaired person, comprising:
   at least one concordant page containing one or more conventional textual characters suitable for reading by a sighted person and one or more Braille characters corresponding to said textual characters,
   said textual and Braille characters being presented on the concordant page in a pattern such that each textual character is associated with its corresponding Braille character in a one-to-one relationship and such that each Braille character is embossed substantially directly below a corresponding textual character,
   wherein said pattern of said textual and Braille characters is presented in a first portion of said page, and
   wherein said concordant page further contains another copy of said textual characters in a second portion thereof, said second portion being sufficiently removed from said first portion so that a sighted person can read the text in said second portion while a visually impaired person is reading the Braille characters in said first portion.

2. The book of claim 1, wherein said second portion is above said first portion.

3. The book of claim 1, wherein said Braille characters comprise uncontracted (Grade 1) characters.

4. The book of claim 1, wherein said Braille characters comprise contracted (Grade 2) characters.

5. A book suitable for concurrent use by a sighted person and a visually impaired person, comprising:
   at least one concordant page containing one or more conventional textual characters suitable for reading by a sighted person and one or more Braille characters corresponding to said textual characters,
   said textual and Braille characters being presented on the concordant page in a pattern such that each textual character is associated with its corresponding Braille character in a one-to-one relationship and such that each Braille character is embossed substantially directly below a corresponding textual character, and
   another page opposite said concordant page, said another page containing a copy of said Braille characters sized and spaced for reading by a visually impaired person.

6. The book of claim 1, wherein said concordant page contains illustrations in a third portion thereof such that said illustrations can be viewed by a sighted person without interference from a hand of a visually impaired person simultaneously reading the Braille characters.

7. A book suitable for simultaneous use by a sighted person and a visually impaired person, comprising:

at least one page upon which one or more conventional textual characters suitable for reading by a sighted person are presented, said textual characters being presented in a first portion of said page, a transparent sheet on which one or more Braille characters corresponding to said conventional textual characters are embossed such that when said sheet is laid over said page each Braille character is positioned substantially directly below and in a one-to-one concordant relationship relative to one of said textual characters corresponding thereto, and another copy of said textual characters presented on a second portion of said page, said second portion being sufficiently removed from said first portion so that a sighted person can read the text in said second portion while a visually impaired person is reading the corresponding Braille characters in correspondence with the textual characters in said first portion of the page.

8. The book of claim 7, wherein said transparent sheet is a page of said book opposite to said at least one page containing said conventional textual characters.

9. A book suitable for concurrent use by a sighted person and a visually impaired person, comprising:

at least one page having a first portion within which one or more conventional textual characters suitable for reading by a sighted person are presented and a second portion within which another copy of said textual characters is presented, a translucent sheet on which one or more Braille characters corresponding to said conventional textual characters are presented such that when said sheet is laid over said page each Braille character is positioned substantially directly below and aligned in a one-to-one concordant relationship relative to one of said textual characters corresponding thereto, wherein said second portion is sufficiently removed from said first portion that a sighted person can read the text in said second portion while a visually impaired person is reading the corresponding Braille characters in correspondence with the textual characters in said first portion of the page.

10. A print medium having a plurality of characters affixed thereto, comprising one or more conventional textual characters suitable for reading by a sighted person printed on a medium, and one or more Braille characters presented on said medium on selected locations thereof so as to provide a one-to-one correspondence between each of said textual characters and its corresponding Braille character and such that each Braille character is presented substantially directly below a corresponding textual character, the corresponding conventional textual and Braille character pairs being presented in a first portion of the print medium, and another copy of said textual characters presented in a second portion of the print medium, said second portion being sufficiently removed from said first portion such that a sighted person can read the textual characters in said second portion while a visually impaired person is reading the corresponding Braille characters in said first portion.

11. The print medium of claim 10, wherein said second portion is positioned above said first portion.

12. The print medium of claim 10, wherein said medium is formed of any of paper or plastic.

13. The print medium of claim 10, wherein said one or more Braille characters are formed of a material different than that of said medium.

14. The print medium of claim 10, wherein said one or more Braille characters comprise one or more visual dots printed on said medium.

* * * * *